United States Patent

Weber

[15] 3,688,594
[45] Sept. 5, 1972

[54] INFINITELY VARIABLE TRANSMISSION
[72] Inventor: Bernhard Weber, Hirzweiler, Saar, Germany
[22] Filed: Nov. 13, 1970
[21] Appl. No.: 89,421

[52] U.S. Cl. ............................................... 74/191
[51] Int. Cl. .......................................... F16h 15/16
[58] Field of Search ........................... 74/191, 190

[56] References Cited

UNITED STATES PATENTS 1,246,683  11/1917  Tooth ........................ 74/191
3,182,519  5/1965  Grieshaber ................. 74/191

*Primary Examiner*—Leonard H. Gerin
*Attorney*—Holman & Stern

[57] ABSTRACT

An infinitely variable transmission comprising a drive shaft with a cup coaxially mounted thereon, a plurality of bevel gears driven by friction wheels mounted on the bevel gear shafts and contacting the side wall of the cup, the bevel gears being in an arrangement at such an angle to each other that their most outside lines are parallel to the axis of a ring contacting the bevel gears and mounted within an second cup being axially adjustable and driving the driven shaft.

7 Claims, 3 Drawing Figures

INFINITELY VARIABLE TRANSMISSION

BACKGROUND OF THE INVENTION

This invention refers to an infinitely variable transmission having a drive shaft and a driven shaft, a bevel gear operatively connected to one of the two shafts and pressed against the inside of a ring operatively connected to the other shaft the bevel gear and the ring being adjustable in relation to each other resulting in a change of the effective radius of the bevel gear and thus of the gear ratio.

In the known transmissions of this type said bevel gear and ring are in an axially parallel position. In order to allow the adjustment mentioned above the bevel gear is moved around an axis parallel to the ring axis and apart from the ring axis wereby that movement vector of the bevel gear falling in the radial direction of the ring is equal to the increase or decrease of distance between the point of contact and the bevel gear axis.

SUMMARY OF THE INVENTION

The object of the present invention is to develop a transmission being able to transfer more power per volume and to achieve a number of other advantages which will be described below.

According to the invention a transmission of the above mentioned type is provided with a plurality of bevel gears being arranged at such an angle to each other that their most outside lines, i. e. the lines on which the point of contact with the ring lies, are parallel to the axis of the ring and the direction of adjustment.

This represents an extremely simple and ingenious design of an infinitely variable transmission. It permits without any difficulty the arrangement of several or even many bevel bears in a minimum of space, which are capable of transferring correspondingly large forces. No movability of the bevel gears is necessary; the gear ratio can be changed merely by an axial movement of the ring. With the exception of the adjusting means, which may be disregarded in this context all parts are arranged in rotary symmetry and move in a consistent sense of rotation. The total absence of any unbalance results in very smooth operation and permits extremely high running speed.

The bearings for the drive shaft and the driven shaft remain free of pressing forces. The entire transmission is easily assembled, worn parts are easily replaced. In comparison to many other transmissions, the one according to the invention has the additional great advantage of being truly infinite variable and of providing a very extensive control range which approaches zero. In addition, this transmission is independent of being positioned vertically, horizontally or at an angle.

An especially advantageous embodiment of the invention consists in the characteristic that the bevel gears are supported in pendulum bearings and held in such a manner that if they pendulate from their central position, they press against the ring. This can be achieved simply and practically by connecting the bevel gears with the corresponding shaft by means of friction wheels which are located on the bevel gear shafts on the other side of the bearings and contact the inside of a further ring which is rigidly connected to the corresponding shaft.

As can be seen from the geometrical conditions, the bevel gears in this design will be pressed against the ring with increasing force when the forces transferred by friction increase; the same is true for the above mentioned friction wheels.

In contrast to most other infinitely variable transmissions which begin to slip at a given, torque dependent transmission capacity this arrangement permits the transfer of nearly any power largely independently of torque.

Even under those conditions unfavorable to power transfer, in which the transmission is not used as a reduction gear and the ring contacts the bevel gears near the top where the friction forces must be all the greater because of the reduced radius, is the pressure large enough; at this time the pendulating distance of the bevel gear will be correspondingly greater.

Under these circumstances no special pressure means are needed and the transmission can be left unloaded when it is not running. Therefore the transmission has the important and rare advantage of being adjustable at a standstill.

Additional characteristics which may serve the realization and advantageous embodiment of the invention, are referred to in the following description of embodiments of the invention as well as in the claims.

DETAILED DESCRIPTION OF TWO PREFERRED EMBODIMENTS

Figure 1:
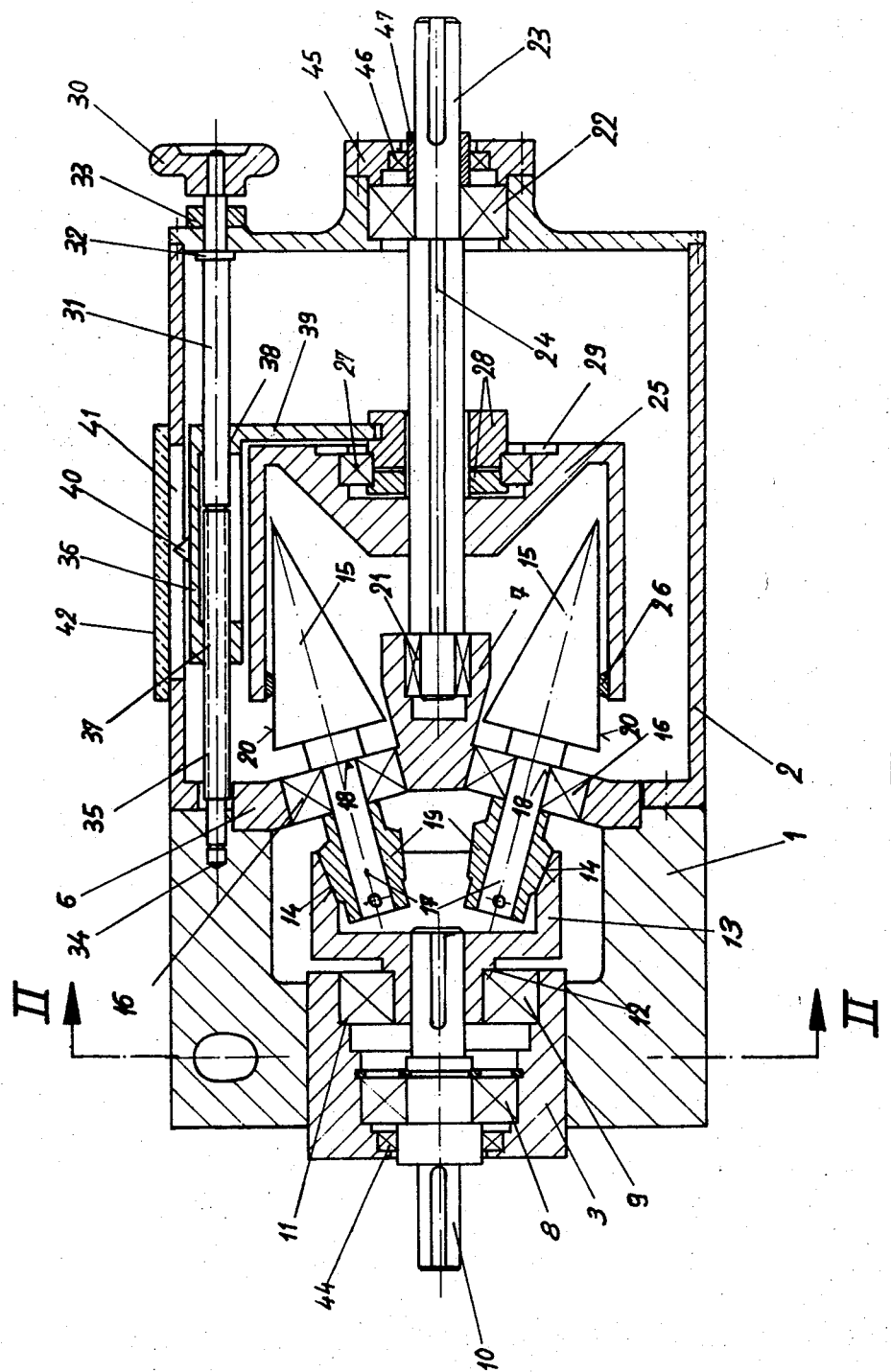
FIG. 1 is a longitudinal section of a transmission according to the invention along the line I—I in FIG. 2.

In the two embodiments those parts which are essentially the same have been given identical reference numerals.

A transmission housing of square cross section consists essentially of a comparatively compact base body 1 and a case 2 rigidly attached to this. The center of the face of the base body 1 contains a cylindrical bushing 3 which is held in place by means of two fasteners 4 (FIG. 2) which are located in a bore of the base body 1 and clamped together by a bolt 5. Also bolted to the base body and centered in a recess of it is a flat conical disc 6 which is provided with a cylindrical projection 7 in its center.

Figure 2:
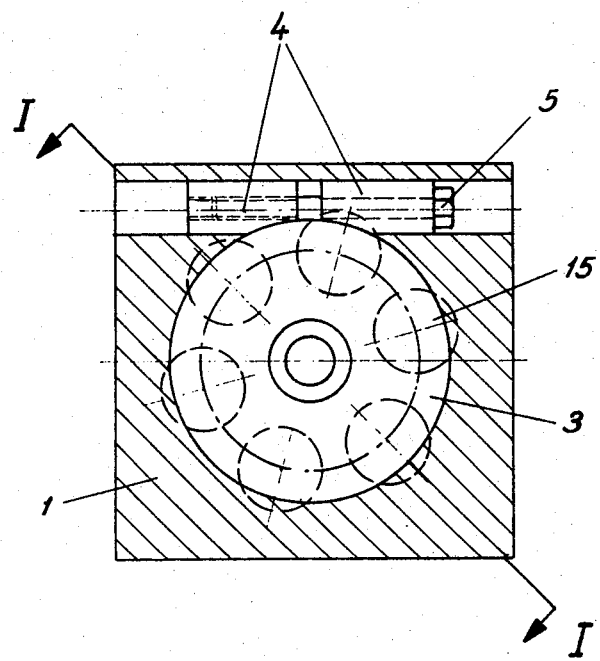
FIG. 2 is a cross section through the transmission according to line II—II in FIG. 1.

The transmission shown in FIG. 1 and 2 comprises a drive shaft or, respectively, a driven shaft 10 which is supported in bushing 3 by means of two ball bearings 8 and 9. Ball bearing 9 which is capable of absorbing axial forces is located between a recess 11 on the inner face of bearing 3 and a recess 12 which is worked into the base of a cup 13 mounted on drive shaft or, respectively, driven shaft 10. The side wall of cup 13 has a bevelled friction surface 14.

In the disc 6 six bevel gears 15 are arranged symmetrically. They are supported by pendulum ball bearings 16 which are contacted without play by a recess 18 of shaft 17 and a friction wheel 19 which is firmly pegged to shaft 17. The pendulum ball bearings 16 are not attached in their axial direction. The friction wheels 19 contact the friction surface 14 of cup 13 by means of a bevelled friction surface.

To avoid speed differences between friction surface 14 and the friction wheels 19 at different points of the contact line this contact line is the bisector of the angle between the axis of shaft 17 and the axis of the drive shaft or, respectively, driven shaft 10. The outermost lines 20 of the bevel gears 15, are parallel to the shaft 10.

The recess 7 and the face of case 2 locate a driven shaft or, respectively, drive shaft 23 by means of ball bearings 21 respectively 22 the latter of which can also absorb axial forces. Inside the transmission housing this shaft is provided with two opposed longitudinal grooves 24. Mounted on the driven shaft, respectively drive shaft 23 is an axially adjustable cylindrical cup 25, which is prevented from turning about the shaft by two keys not shown in the drawings which engage in the longitudinal grooves 24. Attached, for example clamped to the inner wall of cup 25 near its open end is a ring 26. It contacts the outermost lines of the bevel gears 15.

A central recess at the cup base holds in a ball bearing 27, which is capable of absorbing axial forces, a two-part bushing 28, which has no contact with the driven, respectively drive shaft. The two parts of bushing 28 are bolted together and contact the ball bearing 27 from two sides with shoulders. At the outer side ball bearing 27 is held in place and axially immovable by an annular ring 29 bolted to the cup base.

In one corner of the transmission housing and parallel to the driven, respectively drive shaft 23 is an adjustment spindle 31 equipped with a hand wheel 30. At one end it is located axially immovable and without play in the face of case 2 by means of a collar 32 and a clamping ring 33; at the opposite end the spindle 31 is supported in a bore of the base body 1. The adjustment spindle 31 has a thread 35 which is engaged without play by a carriage 36 at 37. At the other end the carriage 36 is supported on the adjustment spindle 31 in such a way that the spindle penetrates the carriage at 38 at an unthreaded section. The carriage 36 incorporates a fork which projects without play into two grooves — not shown in the drawing — which are located opposite each other on the outer side of cylindrical bushing 28.

On the top of the carriage an indicator 40 is mounted which is visible from outside through a plexiglass covered opening 41, which is provided with a scale in the outer wall of case 2.

The transmission housing is filled with oil and therefore closed at the openings for the drive shaft, respectively driven shaft 10 and the driven shaft, respectively drive shaft 23 by an oil seal 44 mounted in the base of bushing 3 and by an oil seal 46 mounted in a cover 45, oil seal 46 contacting a bushing 47 rigidly mounted on shaft 23.

Figure 3:
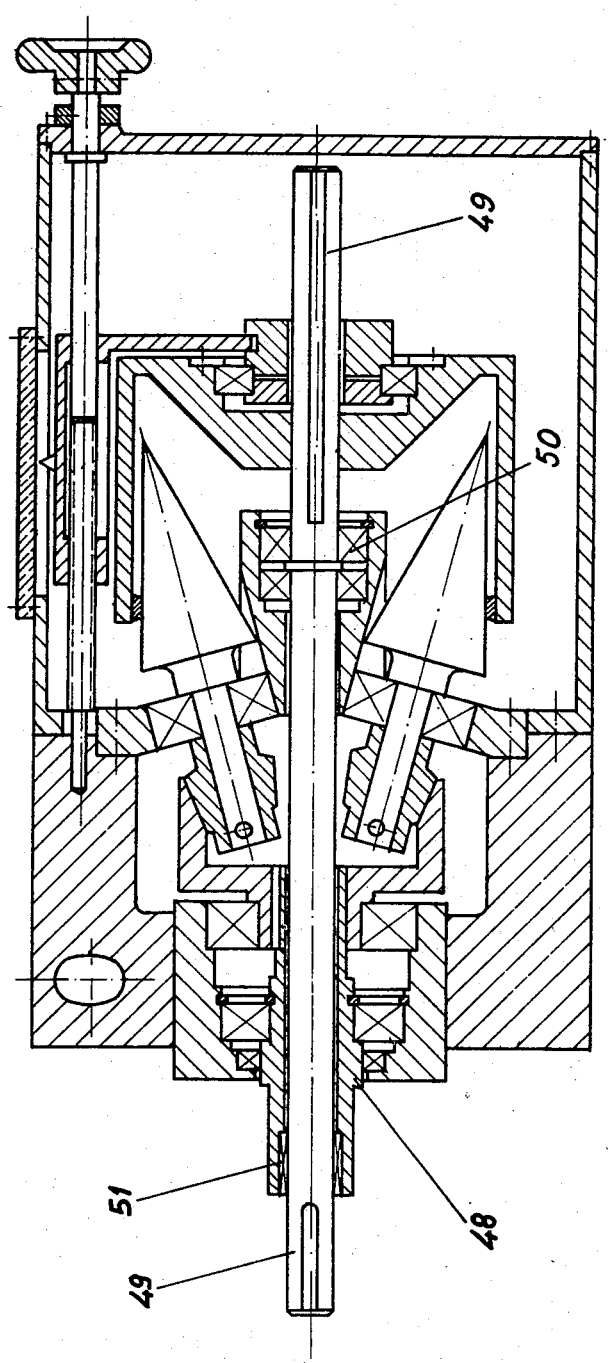
FIG. 3 is a longitudinal section of a different embodiment of the transmission according to the invention.

In the embodiment shown in FIG. 3 the drive, respectively driven shaft 10 is replaced by a tubular shaft 48. The driven shaft, respectively drive shaft 23, which was previously supported by projection 7 on one side and by case 2 on the other side, is replaced by shaft 49 contained in the tubular shaft 48. Shaft 49 now is supported by a ball bearing 50 in the hollow projection 7 on one side and a ball bearing 51 in the tubular shaft 48 on the other side and extends beyond ball bearing 50.

Except for the shafts and the wear and tear parts the transmission can to a large extent be manufactured of light metal. The cup 13 for instance could consist of light metal and a ring 26 made of steel could be clamped into the cup interchangeably.

The transmission can be used as a reduction gear and as a transmission gear. In the first case shaft 10 is the drive shaft which imparts a turning motion to the bevel gears 15 by means of the friction surface 14. The ring 26 which is attached to the cup 25 moves the cup 25 whose rotation is transferred to shaft 23, the driven shaft in this case, by means of the above mentioned keys and the grooves 24. Since the friction forces at the bevel gears 15 and the friction wheels 19 become effective in opposite directions, the shafts 17 with their bevel gears 15 pendulate slightly in their ball bearings as mentioned previously. The pendulating angle is limited by the fact that the friction surface 14 and the ring 26 are curved at a right angle to the drawing plane and therefore exact an increasing counterforce on the friction wheels 19 and the bevel gears 15 as these pendulate. The stronger the forces transferred by friction are, the greater will be the degree of pendulation and consequently the pressure. Pendulating would also be possible if pendulum needle bearings were used instead of the pendulum ball bearings 16.

In order to change the gear ratio the handweel 30 of the adjustment spindle 31 is turned. This moves carriage 36 which transports the cup 25 by means of the fork 39, the two-part bushing 28 and the ball bearing 27, causing the ring 26 to contact the outermost line 20 of the bevel gears 15 at a different point. At this point the bevel gears 15 have another radius and thus another circumferential velocity so that the cup 25 is given a different speed of rotation. The position of the cup 25 in relation to the bevel gears 15 and therefore the gear ratio can be read at the indicator 40 and scale through the plexiglass window 42. Due to the small number of connecting parts between the cup 25 and the indicator 40, and due to the possibility to exclude almost any play between these parts in an embodiment according to the invention, the reading will be very accurate. Very fine adjustment is also possible. If on the basis of installation requirements of the transmission it should be desirable to arrange the adjustment spindle in another corner a suitable opening in the case 2 and a bore 34 in the base body 1 for the adjustment spindle as well as a plexiglass covered opening 41 can be provided in another corner. The adjustment spindle 31 and the carriage 36 are then arranged in the other corner during assembly. If the transmission is used as a transmission gear and not as a reduction gear, shaft 23 becomes the drive shaft while shaft 10 becomes the driven shaft. The power flow described above will change accordingly.

The transmission in FIG. 3, in which drive shaft and driven shaft are installed on the same side, operates according to the same principles as mentioned above.

In assembly, the individual parts of the transmission need only be more or less inserted into one another and bolted together. A special simplification is provided by bushing 3. It is merely pushed into the housing until the friction surface 14 is seated on the friction wheels 19 in such a position that the outermost lines 20 of the bevel gears 15 are parallel to each other. The bushing 3 can now be clamped in place by means of the fasteners 4.

What I claim is

1. In an infinitely variable transmission comprising a drive shaft, a driven shaft, a ring operatively connected to one of said shafts, a bevel gear operatively connected to the other of said shafts and being pressed against the inside of said ring, and means for adjusting said ring and said bevel gear in relation to each other in a manner changing the effective radius of the gear, the improvement consisting in providing a plurality of bevel gears in an arrangement at such an angle to each other that their most outside lines are parallel to the axis of the ring and the direction of adjustment and pendulum bearing supporting means for supporting said bevel gears such that said bevel gears press against said ring when said bevel gears pendulate from a central position thereof.

2. An infinitely variable transmission as claimed in claim 1 wherein in relation to the transmission base body said bevel gears are fixed and said ring is adjustable in its axial direction.

3. In an infinitely variable transmission comprising a drive shaft, a driven shaft, a ring operatively connected to one of said shafts, a bevel gear operatively connected to the other of said shafts and being pressed against the inside of said ring, and means for adjusting said ring and said bevel gear in relation to each other in a manner changing the effective radius of the gear, the improvement consisting in providing a plurality of bevel gears in an arrangement at such an angle to each other that their most outside lines are parallel to the axis of the ring and the direction of adjustment, and wherein said ring is mounted within a cup being mounted on the corresponding shaft on which the cup is radially fixed but axially adjustable by means of a spindle operated fork, which engages in corresponding recesses of a part coaxially arranged to the cup and connected to the cup by means of a rotary bearing.

4. In an infinitely variable transmission comprising a drive shaft, a driven shaft, a ring operatively connected to one of said shafts, a bevel gear operatively connected to the other of said shafts and being pressed against the inside of said ring, and means for adjusting said ring and said bevel gear in relation to each other in a manner changing the effective radius of the gear, the improvement consisting in providing a plurality of bevel gears in an arrangement at such an angle to each other that their most outside lines are parallel to the axis of the ring and the direction of adjustment, and wherein an indicator for the axial adjustment of the ring is connected with the adjustment means for the ring.

5. In an infinitely variable transmission comprising a drive shaft, a driven shaft, a ring operatively connected to one of said shafts, a bevel gear operatively connected to the other of said shafts and being pressed against the inside of said ring, and means for adjusting said ring and said bevel gear in relation to each other in a manner changing the effective radius of the gear, the improvement consisting in providing a plurality of bevel gears in an arrangement at such an angle to each other that their most outside lines are parallel to the axis of the ring and the direction of adjustment, and wherein the bevel gears are supported in bearings and are connected to the said one of the shafts by means of conical friction wheels on the bevel gear shafts on one side of the shaft bearings, the conical friction wheels contacting the inside of an additional cup rigidly connected with the said one shaft.

6. An infinitely variable transmission as claimed in claim 5 wherein the contact lines of the friction wheels (19) and their corresponding friction surface on the inside of said cup is the bisector of the angle between the axis of the bevel gears and the axis of the cup.

7. In an infinitely variable transmission comprising a drive shaft, a driven shaft, a ring operatively connected to one of said shafts, a bevel gear operatively connected to the other of said shafts and being pressed against the inside of said ring, and means for adjusting said ring and said bevel gear in relation to each other in a manner changing the effective radius of the gear, the improvement consisting in providing a plurality of bevel gears in an arrangement at such an angle to each other that their most outside lines are parallel to the axis of the ring and the direction of adjustment, and wherein the shaft of the cup is supported in a bushing which is axially movable and is attachable in the base body.

* * * * *